Feb. 9, 1943.                J. B. WHITLOW                2,310,724
                         AUTOMATIC TRANSMISSION
                           Filed July 19, 1941
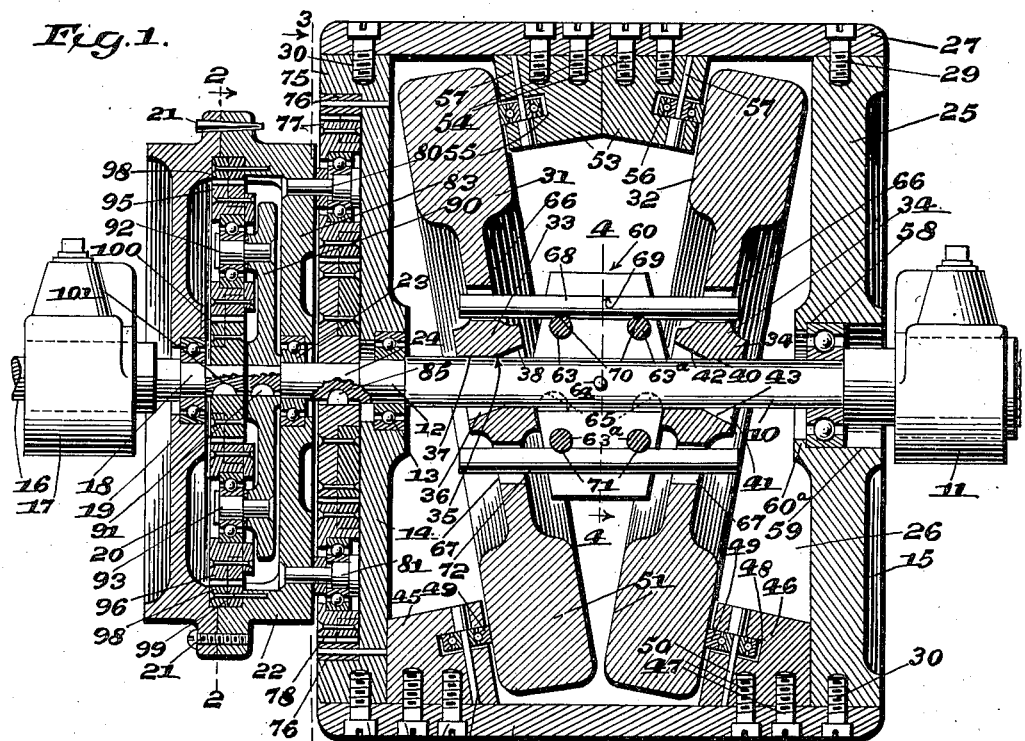
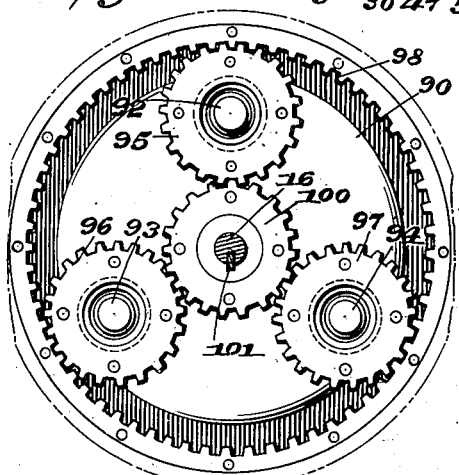
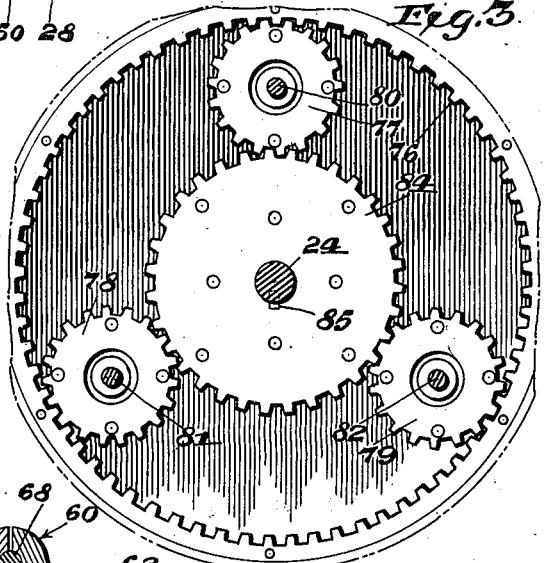
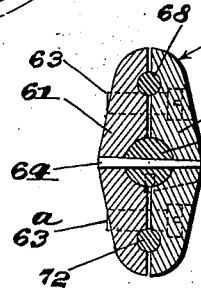
Inventor
John B. Whitlow
By Munn, Anderson + Liddy
Attorneys Patented Feb. 9, 1943

2,310,724

UNITED STATES PATENT OFFICE 2,310,724

AUTOMATIC TRANSMISSION

John B. Whitlow, Cincinnati, Ohio

Application July 19, 1941, Serial No. 403,225

8 Claims. (Cl. 74—259)

This invention relates to an automatic transmission.

An object of the invention is the provision of a transmission which will automatically operate in accordance with the speed of the drive shaft in which gyroscopically mounted fly-wheels cooperate in a novel manner for aiding in controlling the connection between the drive shaft and a driven shaft through the intermediary of a plurality of gears.

Another object of the invention is the provision of a transmission for any suitable purpose in which the power applied to a drive shaft is transmitted to a driven shaft through the intermediary of a casing, groups of intermeshing gears and fly-wheels rotated by the drive shaft in planes which are at acute angles to the longitudinal axis of said shaft, the fly-wheels controlling the speed of the revolving casing and likewise the speed of the driven shaft through the series of intermeshing gears.

A further object of the invention is the provision of a transmission in which a casing is mounted for rotation on a drive shaft and which is caused to be revolved by means of fly-wheels which have rolling contact with the casing and which are revolved by the drive shaft, said fly-wheels being connected together for simultaneous rotation and at an acute angle to each other, means within the casing and engaging the fly-wheels for changing the plane of rotation of the fly-wheels as the speed of rotation of the casing is decreased whereby the energy imparted to the drive shaft is proportionately applied to a driven shaft until a point is reached where the drive shaft and driven shaft are revolved at simultaneous speeds.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a longitudinal vertical section of a transmission constructed in accordance with the principles of my invention, Figure 2 is a transverse vertical section taken along the line 2—2 of Fig. 1.

Figure 3 is a vertical section taken along the line 3—3 of Fig. 1.

Figure 4 is a transverse vertical section taken along the line 4—4 of Fig. 1.

Referring more particularly to the drawing, 10 designates a drive shaft which has one end mounted in a pillow block 11. The other end is reduced as shown at 12 and this reduced portion is received by a bearing 13 mounted centrally of a cover plate 14 of a rotatable housing or casing 15.

The driven shaft 16 is mounted in a pillow block 17 and has a reduced portion 18 mounted in a bearing 19 in a plate 20 secured at 21 to a cup-shaped housing 22. This housing carries a centrally disposed bearing 23 which receives a reduced portion 24 of the drive shaft 10.

The casing 15 is substantially circular and is closed at its opposite ends by the plate 14 and a plate 25. The wall 26 of the housing or casing is circular and has diametrically disposed openings which are closed by cover plates 27 and 28. These plates are secured by means of machine screws 29 and 30 to the end plates 14 and 25.

A pair of fly-wheels 31 and 32 have hub portions 33 and 34 respectively. It will be noted that each hub portion has a central opening to receive the shaft 10. The hub portion 33 has a central section 35 which approximates the diameter of the shaft 10. From the central section 35 the opening 36 in the hub 33 is flared outwardly from opposite sides of said central section as shown at 37 and 38. Similarly the hub 34 has a central section 40 which approximates the diameter of the shaft 10 while upon opposite sides of the central section the opening 41 in the hub is flared in opposite directions as shown at 42, 43. By this construction the fly-wheels 31 and 32 are tilted to the vertical and approximately one-half of the passage 36 in the hub 33 and approximately one-half of the passage 41 in the hub 44 affords a bearing on the shaft 10.

The fly-wheels 31 are tilted at an acute angle to each other so that when the portions of the fly-wheels revolve through the lower part of the casing 15 their inner peripheries will be close to each other, while the upper portion of the periphery will be farther away. It will be appreciated that the flared portions 42 and 43 of the hub 34 and the flared portions 37 and 38 of the hub 33 will determine the angle of tilting of the fly-wheels 31 and 32.

A pair of blocks 45 and 46 are secured by screws 47 to the cover 28. Each of these blocks is provided with an opening 48 to receive a roller 49 carried by a shaft 50 mounted in each of the blocks 45 and 46. The peripheries of the rollers engage the side walls of the rims 51 of the wheels 31 and 32.

A pair of blocks 53 are secured by screws 54 to the removable cover 27. Each of these blocks is provided with a pocket 55 to receive a roller 56 that is carried by a shaft 57. These rollers have the usual form of bearing for the purpose. Furthermore, the peripheries of these rollers project sufficiently beyond the pocket 55 so that they will engage the inner faces of the peripheries of the rims 51. The rollers 49 and 56 cooperate with the flared walls in the hubs 33 and 34 for aiding in maintaining the proper angular relation between the fly-wheels 31 and 32.

A bearing 58 is mounted within a central opening 59 in the end plate 25 and receives the shaft 10. This bearing is held in place by means of a ring 60a formed at the inner wall of the end plate 25.

A division block, generally designated by the numeral 60, is formed of the two sections 61 and 62 shown in Fig. 4 which are connected together by means of machine screws 63 which are located upon opposite sides of the shaft 10. These sections are not only connected together, but are secured to the shaft 10 by means of a tapered pin 64 and also by means of keys 65.

Each of the wheels 31 and 32 is provided with diametrically disposed passages 66 and 67. A rod 68 is mounted in a passage 69 formed between the sections 61 and 62 and these rods are provided with notches 70 through which the screws 63 are passed. Thus, the rod 68 is prevented from slipping in the sections 61 and 62 of the member 60.

Screws 63a also pass through notches 71 formed in a rod 72 which is located parallel to the shaft 10 and diametrically opposite the rod 68. It will be noted that the rod 68 has its end extending through the passages 66 in the wheels 31 and 32 while the ends of the rod 72 extend through the passages 67 in the same wheels, but upon the opposite side of the shaft 10.

It will be further noted that the passages 66 and 67 have a greater diameter than the diameters of the rods 68 and 72 because the points of the wheels 31 and 32 are constantly changing their relative positions as they pass from the upper portion of the casing 15 to the lower portion. In other words, similarly disposed points of the wheels are moved towards and away from each other through 360° of travel.

The end plate 14 is provided with an annular rib 75 into which is pressed a ring gear 76 as shown more particularly in Fig. 3. A plurality of planetary gears 77, 78, 79 mesh with the ring gear 76 and are respectively mounted on the shafts 80, 81 and 82. These shafts are secured to the rear wall 83 of the housing 22. A sun gear 84, as shown at 85, is keyed to the reduced portion 24 of the shaft 10 and is, therefore, revolved by said shaft. The rotation of the shaft 84 rotates the planetary gears 77, 78 and 79 and at times will cause rotation of the ring gear 76.

A disc 90 is keyed at 91 to the extreme end of the shaft 10 adjacent the rear wall 83 of the housing 22. This disc carries countershafts 92, 93 and 94 upon which are rotatably mounted in the respective order gears 95, 96 and 97. These last-mentioned gears in turn mesh with a ring gear 98 which is secured at 99 to the housing 22.

A sun gear 100 is keyed at 101 to the driven shaft 16 and meshes with the planetary gears 95, 96 and 97.

Power goes through driving shaft 10 to spider 90 in which are set stub axles 92, 93, 94, carrying planetary gears 95, 96, 97. Sun gear 100 keyed on driven shaft 16, is held by inertia of the vehicle. Ring gear 98 turns faster than spider due to revolution of planetaries on their stub axles. Stub axles 80, 81, 82, carrying the respective planetaries 77, 78, 79, are set in casing 20, 22, in which is fixedly mounted ring gear 98. Rotation of ring gear 98 and housing 22 carries planetaries 77, 78, 79, about sun gear 84 which is keyed to driving shaft 10 at reduction 24. As housing 22 is revolving faster than driving shaft 10, ring gear 76 will be revolved faster than said housing due to revolutions of planetaries 77, 78, 79 on stub axles 80, 81, 82 caused by the slower speed of sun gear 84 which is keyed to driving shaft 10 at 24.

As the ring gear 76 is fixedly mounted in casing 15, said casing revolves. In it are set rollers 48, 49, 55, 56. These rollers, by the revolution of the casing, upset the gyroscopic balance of the flywheels 33, 34, which are universally mounted on shaft 10. As it takes force to alter the gyroscopic plane of a rotating wheel, the above action acts as a brake to check the free rotation of the casing 15. As driving shaft 10 increases in speed, the flywheels 33, 34 do also and, as a result, have more gyroscopic force. Also the casing 15 will be revolving more rapidly and upsetting the plane of rotation of the flywheels faster, all of which increases the braking action of the casing. This braking action is transferred through the gears to act on the sun gear 100 keyed to shaft 16 in the form of torque finally overcoming the inertia of the vehicle as expressed through gear 100. The increasing rotation of gear 100 will eventually cause the machine to revolve as a unit.

The torque thrown upon the sun gear 100 by the planetaries 92, 93, 94 is due to the tendency of the spider 90 to rotate and the ring gear 98 to "brake"—due to the ring gear's aforesaid connection with the rollers upsetting the flywheels' gyroscopic balance. Equal to the force it exerts to turn the sun gear 100, the ring gear 98 exerts a force in the opposite direction upon the spider 90. This force if allowed to exist would dissipate the kinetic energy stored in the flywheels so that the mechanism would not be a torque increaser. To offset this condition a balancing mechanism is provided by mounting the stub axles 80, 81, 82 in the housing 22 with the planetaries 77, 78, 79 upon them in mesh with the sun gear 84 which is keyed to the driving shaft 10 at 24 and to the ring gear 76 which is fixedly mounted in the casing 15, in which the upsetting rollers are placed. It will be noted that the pitch line of the teeth of gear 84 are the same distance from the center of driving shaft 10 as the centers of the stub axles 92, 93, 94. As the ring gear 76 is braking and the planetaries 77, 78, 79 are being pulled by the housing 22 through the stub axles 80, 81, 82, a force is exerted upon the teeth of the sun gear 84 in the direction of the engine's rotation which exactly equals the force in the opposite direction exerted with the same leverage upon the spider 90 by the ring gear 98 through the planetaries 95, 96, 97. Hence the power taken from the driving shaft 10 at the spider 90 in upsetting the gyroscopic balance of the flywheels to provide torque upon the sun-gear 100 is given back to the driving shaft through the sun gear 84. Thus if the sun gear 100 which is keyed to driven shaft 16 does not turn, no work is done and the energy poured into the mechanism by the engine goes to increasing the speed of the flywheels and is there held in the form of kinetic energy, as there is no force to dissipate it other than unavoidable friction. Unless the sun gear 100 turns, the kinetic energy keeps piling up and piling up until either the sun gear is forced to turn or the machine breaks.

I claim:

1. A transmission comprising a drive shaft, a driven shaft in alignment with the drive shaft, a casing mounted for independent rotation on the drive shaft and provided with a ring gear adjacent the inner end thereof, a fly-wheel having a hub portion provided with a rockable bearing on the drive shaft so that the wheel may rock to one side of a vertical plane transverse to the longitudinal axis of the drive shaft, means forming a driving connection between the wheel and drive shaft, a sun gear keyed to an intermediate portion of the drive shaft, a housing rotatable on the drive shaft adjacent the sun gear, a plurality of planetary gears rotatably carried by the outer face of the housing and meshing respectively with the ring and sun gears, a disk in the housing and keyed to the drive shaft, a sun gear in the housing and keyed to the driven shaft, a ring gear secured to and within the housing, planetary gears rotatably mounted on the disk and meshing with the said sun gear and second-mentioned ring gear, and means on the casing adapted to be engaged by the fly-wheel for causing rocking of the fly-wheel during differential speeds between fly-wheel and casing.

2. A transmission comprising a drive shaft, a driven shaft aligned longitudinally with the drive shaft, a casing mounted for rotation independent of the drive shaft and provided with a ring gear adjacent the inner end of the drive shaft, a pair of fly-wheels, a rockable mounting connecting the fly-wheels to the drive shaft, a sun gear keyed to the drive shaft in line with the ring gear, a housing rotatable on the shafts and having a plurality of axles extending laterally from the outer wall thereof, a gear on each axle and meshing simultaneously with the ring gear and the last-mentioned gears, and means on the inner face of the casing and engaging the fly-wheels for causing said fly-wheels to rock to one side of a vertical plane transversely disposed of the shaft, a disk in the housing keyed to the drive shaft and provided with laterally projecting axles, a planetary gear on each axle, a ring gear secured to the inner wall of the housing, a sun gear keyed to the driven axle, the second-mentioned planetary gears meshing with the second-mentioned sun gear and ring gear.

3. A transmission comprising a drive shaft, a driven shaft aligned longitudinally with the drive shaft, a casing mounted for independent rotation on the drive shaft, and provided with a ring gear adjacent the meeting ends of the shafts, a pair of fly-wheels, a rockable mounting for the fly-wheels on the drive shaft, means connecting the fly-wheels to said shaft, a sun gear keyed to the drive shaft in line with the ring gear, a plurality of planetary gears having intermediate meshing relation between the ring gear and sun gear, a housing enclosing the meeting end of the shafts and rotatable thereon, axles projecting from an end wall of the housing and rotatably supporting the planetary gears, rollers mounted for rotation in the casing and contacting the opposite faces of the fly-wheels for causing said fly-wheels to rock to one side of a vertical plane transversely disposed of the shaft and to rock around a vertical axis of said wheels when the fly-wheels and casing are rotating at differential speeds, gearing including planet gears connecting the housing with the driven shaft, and a carrier for the planet gears connected to the drive shaft.

4. A transmission comprising a drive shaft, a driven shaft aligned longitudinally with the drive shaft, a casing mounted for independent rotation on the drive shaft and provided with a ring gear adjacent the driven shaft, a pair of fly-wheels, a rockable mounting for the fly-wheels on the drive shaft, means connecting the fly-wheels with the driven shaft, a sun gear keyed to the drive shaft in line with the ring gear, a plurality of axles, a cup-shaped member rotatable on the drive shaft and provided with planetary gears on the axles and meshing simultaneously with the ring gear and the sun gear, means in the casing for engaging the outer faces of the fly-wheels for causing said fly-wheels to rock in a plurality of directions when the casing and drive shaft are revolved at different speeds, gearing including planet gears connecting the cup-shaped member with the driven shaft, and a carrier for the planet gears connected to the drive shaft.

5. A transmission comprising a drive shaft, a driven shaft aligned longitudinally with the drive shaft, a casing mounted for independent rotation on the drive shaft and provided with a ring gear adjacent the driven shaft, a pair of fly-wheels, a rockable mounting for the fly-wheels on the drive shaft, means connecting the fly-wheels with the driven shaft, a sun gear keyed to the drive shaft in line with the ring gear, a plurality of axles, a cup-shaped member rotatable on the drive shaft and provided with planetary gears on the axles and meshing simultaneously with the ring gear and the sun gear, means in the casing for engaging the outer faces of the fly-wheels for causing said fly-wheels to rock in a plurality of directions when the casing and drive shaft are revolved at different speeds, gearing including planet gears connecting the cup-shaped member with the driven shaft, and a carrier for the planet gears connected to the drive shaft, said fly-wheel engaging means disposed at diametrically opposite points on the inner wall of the casing and having approximately the same weight.

6. A transmission comprising a drive shaft, a driven shaft in alignment with the drive shaft, a casing mounted for independent rotation on the drive shaft and provided with a ring gear adjacent the inner end of the driven shaft, fly-wheels, means mounting the wheels on the drive shaft so that the wheels may rock to one side of a vertical plane transverse to the longitudinal axis of the drive shaft, and so that said wheels may be rocked around a vertical axis, means in the casing for controlling the rocking of said wheels, means connecting the wheels to the drive shaft, a sun gear keyed to an intermediate portion of the drive shaft, planetary gears intermeshing with the sun gear and the ring gear, rotatable means on the drive and driven shafts for supporting the planetary gears, means connecting the last-mentioned means with the driven shaft including a planetary gearing, a support for the gearing keyed to the driving shaft and a sun gear keyed to the driven shaft and meshing with the planetary gearing, and a ring gear on the rotatable means meshing with the planetary gearing.

7. A transmission comprising a drive shaft, a driven shaft in alignment with the drive shaft, a casing mounted for independent rotation on the drive shaft and provided with a ring gear adjacent the inner end of the drive shaft, a fly-wheel, means universally mounting the fly-wheel on the drive shaft and within the casing, means connecting the fly-wheel with the drive shaft, a sun gear keyed to an intermediate portion of the drive shaft, a plate rotatable on the drive shaft adjacent the sun gear, a plurality of planetary gears rotatably carried by the plate and meshing respectively with the ring and sun gears, means on the casing adapted to be engaged by the fly-wheel for causing rocking of the fly-wheel in a plurality of directions during differential speeds between the fly-wheel and casing for controlling the speed of rotation of said casing, a ring gear carried by the plate, a sun gear keyed to the driven shaft, a plurality of planetary gears meshing with the last mentioned sun gear and planetary gears, and a support for the planetary gears keyed to the drive shaft.

8. A transmission comprising a drive shaft, a driven shaft in alinement with the drive shaft, a casing mounted for independent rotation on the drive shaft and provided with a ring gear adjacent the inner end of said drive shaft, a pair of fly-wheel means universally mounting the fly-wheels on the drive shaft and within the casing, a block secured to the drive shaft and located between the fly-wheels, a rod secured to the block at each side of the drive shaft, said fly-wheels having openings to receive the ends of the rods, said fly-wheels being rocked normally at an acute angle to each other, means within the casing and engaging opposite faces of the fly-wheels for causing rocking of the fly-wheels in a plurality of directions during differential speeds between the fly-wheels and the casing, a sun gear keyed to an intermediate portion of the drive shaft and located in a vertical plane passing through the ring gear, a plate rotatable on the drive shaft, a plurality of planetary gears rotatably carried by the plate and meshing respectively with the ring and sun gears, a second plate keyed to the drive shaft and located adjacent the first-mentioned plate, a sun gear keyed to the driven shaft, a ring gear carried by the first-mentioned plate, a plurality of planetary gears rotatably supported on the second-mentioned plate and intermeshing with the second-mentioned sun gear and the second-mentioned ring gear.

JOHN B. WHITLOW.